(12) United States Patent
Keenan et al.

(10) Patent No.: US 10,711,883 B2
(45) Date of Patent: Jul. 14, 2020

(54) CONSOLE ASSEMBLY WITH STOWABLE TRANSMISSION SHIFTER AND FOLDING ARMREST

(71) Applicant: FORD GLOBAL TECHNOLOGIES, LLC, Dearborn, MI (US)

(72) Inventors: Jason Michael Keenan, Dearborn, MI (US); Ryan Mathew Sandor, North Wales, PA (US); Paul Christopher Mutter, Detroit, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 109 days.

(21) Appl. No.: 15/902,658

(22) Filed: Feb. 22, 2018

(65) Prior Publication Data

US 2018/0244182 A1     Aug. 30, 2018

Related U.S. Application Data

(60) Provisional application No. 62/463,390, filed on Feb. 24, 2017.

(51) Int. Cl.
| *F16H 59/10* | (2006.01) |
| *B60N 2/75* | (2018.01) |
| *F16H 59/08* | (2006.01) |
| *B60R 7/04* | (2006.01) |
| *F16H 59/02* | (2006.01) |

(52) U.S. Cl.
CPC ............. *F16H 59/105* (2013.01); *B60R 7/04* (2013.01); *F16H 59/08* (2013.01); *F16H 59/10* (2013.01); *F16H 59/0278* (2013.01)

(58) Field of Classification Search
CPC .......... B60N 2/75; B60N 2/763; B60N 2/773; B60N 2/777; B60N 2/79; B60R 7/04; F16H 59/0278; F16H 59/08; F16H 59/10; F16H 59/105; F16H 59/12
USPC .................................... 296/1.09, 24.34, 37.8
See application file for complete search history.

(56) References Cited

U.S. PATENT DOCUMENTS

| 5,617,929 A | 4/1997 | Richardson et al. |
| 6,065,560 A | 5/2000 | Palmeri et al. |
| 6,253,869 B1 | 7/2001 | Wilson et al. |

(Continued)

FOREIGN PATENT DOCUMENTS

| CN | 2625193 Y | 7/2004 |
| CN | 201769688 U | 3/2011 |

(Continued)

OTHER PUBLICATIONS

English Machine Translation of CN201769688U.

(Continued)

*Primary Examiner* — Jason S Daniels
(74) *Attorney, Agent, or Firm* — David Coppiellie; King & Schickli, PLLC

(57) ABSTRACT

A console assembly includes a base, a transmission shifter and an armrest. The transmission shifter is carried on the base and is displaceable between a plurality of transmission mode defining positions and a storage position wherein the transmission shifter is held within a shifter receiver in the base. The armrest is carried on the base and may be displaceable between a home position and a deployed position wherein a portion of the armrest overlies the transmission shifter in the shifter receiver.

18 Claims, 6 Drawing Sheets

(56) References Cited

U.S. PATENT DOCUMENTS

| | | | | |
|---|---|---|---|---|
| 6,564,661 | B2* | 5/2003 | DeJonge | B60K 37/06 |
| | | | | 74/335 |
| 6,601,685 | B2* | 8/2003 | Nagasaka | B60K 37/06 |
| | | | | 192/218 |
| 6,736,438 | B1 | 5/2004 | Wieclawski | |
| 8,025,327 | B1* | 9/2011 | Schowalter | B60K 37/00 |
| | | | | 296/70 |
| 8,235,162 | B2 | 8/2012 | Wihinen | |
| 8,601,896 | B2* | 12/2013 | Skogward | B60K 20/04 |
| | | | | 74/473.23 |
| 9,140,353 | B2 | 9/2015 | Meyer et al. | |
| 9,303,755 | B2* | 4/2016 | Kim | F16H 59/105 |
| 9,458,925 | B1 | 10/2016 | Ding | |
| 2002/0139602 | A1 | 10/2002 | Okanda | |
| 2003/0155786 | A1 | 8/2003 | Kim et al. | |
| 2004/0159487 | A1 | 8/2004 | Wendeberg et al. | |
| 2007/0176448 | A1 | 8/2007 | Spykerman et al. | |
| 2007/0204718 | A1 | 9/2007 | Strait et al. | |
| 2008/0100086 | A1 | 5/2008 | Vermeersch et al. | |
| 2010/0056331 | A1 | 3/2010 | Johansson et al. | |
| 2010/0090491 | A1 | 4/2010 | Hipshier et al. | |
| 2010/0244478 | A1 | 9/2010 | DePue | |
| 2014/0284957 | A1 | 9/2014 | Duenas et al. | |
| 2014/0346802 | A1 | 11/2014 | Horton et al. | |
| 2015/0258923 | A1 | 9/2015 | Skapof et al. | |
| 2016/0176290 | A1 | 6/2016 | Quijano | |

FOREIGN PATENT DOCUMENTS

| | | | |
|---|---|---|---|
| DE | 102010050739 | A1 | 5/2012 |
| JP | 2000085397 | A | 3/2000 |
| JP | 2006160098 | A | 6/2006 |
| JP | 2016015094 | A | 1/2016 |
| KR | 20130063830 | A | 6/2013 |

OTHER PUBLICATIONS

English Machine Translation of CN2625193Y.
Non-Final Office action dated May 10, 2019 for U.S. Appl. No. 15/902,687, filed Feb. 22, 2018.
Office action dated Feb. 12, 2020 for Application no. 151902,601 filed Feb. 22, 2018.
English Machine Translation of Abstract for JP2000085397A dated 2000-03-28.
English Machine Translation of Abstract for JP2006160098A dated 2006-06-22.
English Machine Translation of DE102010050739A1 dated 2012-05-10.
English Machine Translation of KR20130063830A dated 2013-06-17.
English Machine Translation of Abstract for JP2016015094A dated 2016-01-28.

* cited by examiner

CONSOLE ASSEMBLY WITH STOWABLE TRANSMISSION SHIFTER AND FOLDING ARMREST

This application claims the benefit of provisional patent application Ser. No. 62/463,390 filed on 24 Feb. 2017, the full disclosure of which is incorporated by reference.

TECHNICAL FIELD

This document relates generally to the motor vehicle equipment field and, more particularly, to a new and improved console assembly equipped with a stowable transmission shifter and a folding armrest.

BACKGROUND

It is known in the art to provide a motor vehicle with a transmission shifter on the center console. Such a transmission shifter includes a base, a stalk or shaft and a handle that projects upwardly from the center console where it may be easily accessed and used to select one or more transmission modes, such as PARK, REVERSE, NEUTRAL and DRIVE.

While such a transmission shifter is easy to reach and access and therefore easy to use, it should be appreciated that it takes up a significant amount of space on the center console and in many ways limits how the center console may be equipped with other convenience features.

This document relates to a new and improved console assembly including a stowable transmission shifter that may be displaced into a storage position within a shifter receiver within the base of the console. Further, the console assembly includes an armrest that may be folded in a manner so as to (a) overlie the transmission shifter in the shifter receiver and (b) provide for a convenient work surface. Accordingly, the new and improved console assembly described herein represents a significant advance in the motor vehicle arts.

SUMMARY

In accordance with the purposes and benefits described herein, a console assembly is provided. That console assembly comprises a base, a transmission shifter carried on the base, and an armrest carried on the base. The transmission shifter is displaceable between a plurality of transmission mode defining positions and a storage position. The armrest is displaceable between a home position and a deployed position.

The armrest may include a first section connected to the base and a second section connected by a first pivot feature to the first section. The second section may overlie the first section when in the home position. The second section may overlie the transmission shifter when the transmission shifter is in the storage position and the armrest is in the deployed position.

The base may include a shifter receiver. The transmission shifter may rest within the shifter receiver when in the storage position. In one of the many possible embodiments, the shifter receiver may be recessed with respect to an upper surface of the base and the transmission shifter may be held completely below the upper surface when in the storage position.

The second section may include an armrest cushion on a first side and a first work surface on a second side opposite the first side. The first section may include a second work surface. When the armrest is in the home position, the armrest cushion is exposed and the first work surface is facing the second work surface. In contrast, when the armrest is in the deployed position, the first work surface is exposed and the armrest cushion is oriented toward and overlies the shifter receiver. The console assembly may further include a first releasable latch feature to secure the second section in the home position.

Still further the armrest may include a third section connected by a second pivot feature to the first section. The third section may include a second armrest cushion on a first face and a third work surface on a second face opposite the first face. When the armrest is in the home position the second armrest cushion may be exposed and the third work surface may face the second work surface. In contrast, when the armrest is in the deployed position the third work surface may be exposed and the second armrest cushion may be oriented so as to overlie a cup holder adjacent the shifter receiver. Advantageously, in this fully deployed position, the first work surface, the second work surface and the third work surface form a smooth and flat expansive work area that may, for example, but utilized as a desktop for writing notes or supporting a laptop computer.

The console assembly may further include a second releasable latch feature to secure the third section in the home position.

A storage bin may be provided in the base underlying the first section of the armrest. A hinge may connect the first section of the armrest to the base. That hinge may be located at an end of the armrest opposite the first pivot feature. Advantageously, the hinge allows one to pivot the entire armrest to an open position in order to allow access to the storage bin. In contrast, when the armrest is in the closed position the storage bin is fully concealed by the armrest. A third releasable latch feature may be provided to secure the armrest in that closed position.

In the following description, there are shown and described several preferred embodiments of the console assembly. As it should be realized, the console assembly is capable of other, different embodiments and its several details are capable of modification in various, obvious aspects all without departing from the console assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the console assembly and together with the description serve to explain certain principles thereof.

Figure 1:
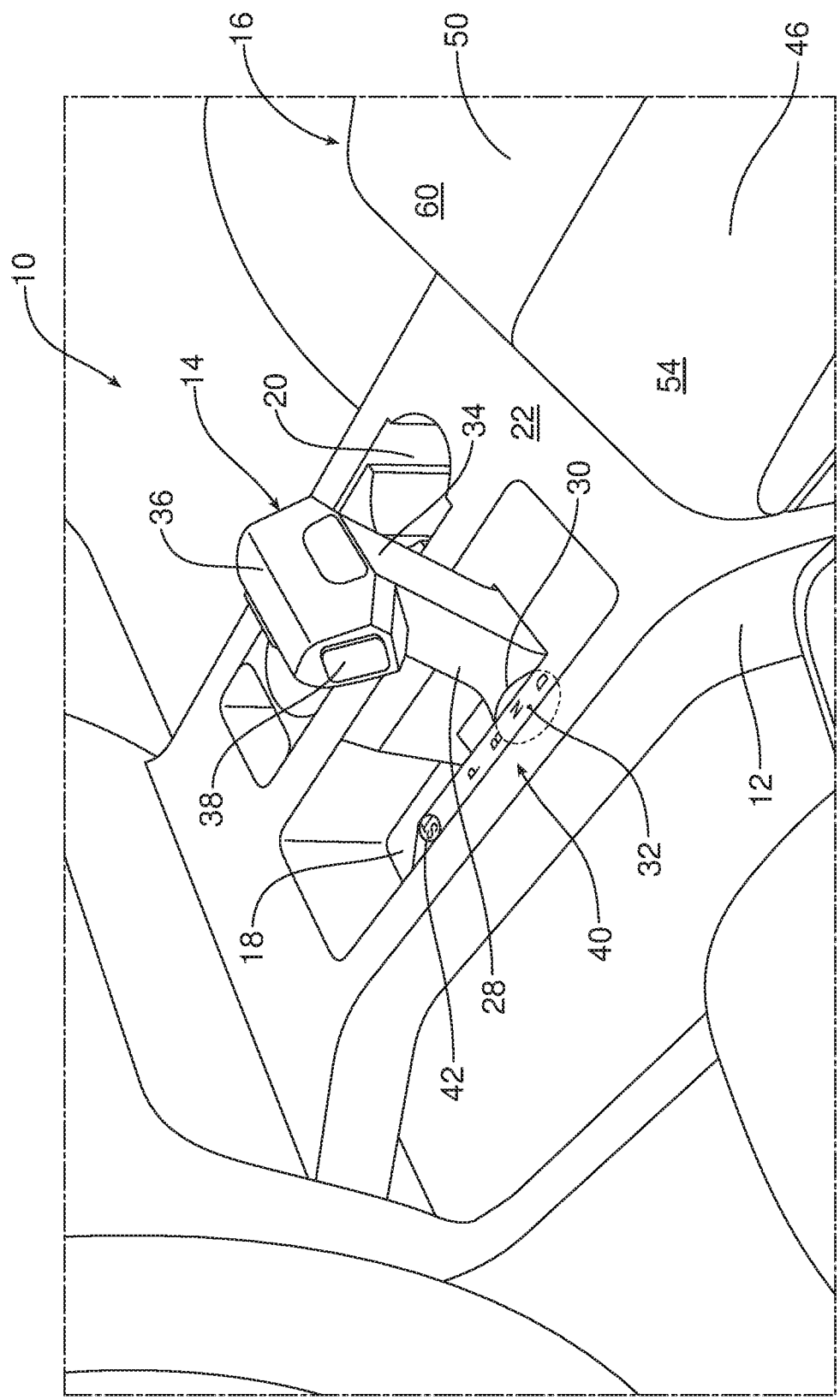
FIG. 1 is a detailed perspective view illustrating the transmission shifter in the drive position.

Reference will now be made in detail to the present preferred embodiments of the console assembly, examples of which are illustrated in the accompanying drawing figures.

DETAILED DESCRIPTION

Reference is now made to FIGS. 1-6 illustrating the new and improved console assembly 10. That console assembly 10 includes a base 12, a transmission shifter 14 carried on the base and an armrest 16 carried on the base.

The base 12 includes a shifter receiver 18 and a cup holder 20 both recessed with respect to an upper surface 22 of the base. The base 12 also includes a storage compartment or storage bin 24 provided in the base, motor vehicle rearward of the shifter receiver 18 and cup holder 20, and directly below the armrest 16. When the armrest 16 is in the closed position, illustrated in full line in FIG. 6, the armrest covers and conceals the storage bin 24. In contrast, when the armrest 16 is pivoted about the hinge 26 into the open position illustrated in phantom line in FIG. 6, it is possible to freely access the storage bin 24 through a now-open top.

The transmission shifter 14 of the illustrated embodiment includes a stalk or shaft 28 having a proximal end 30 connected by means of a pivot pin 32 to the base 12 and a distal end 34 connected to a handle 36. Handle 36 includes a first push button 38 that is depressed to angularly displace the transmission shifter 14 between a plurality of transmission mode defining positions. In the illustrated embodiment, the transmission mode defining positions include PARK, REVERSE, NEUTRAL and DRIVE. The indicators 40 on the base 12 adjacent the transmission shifter 14 identify the selected transmission mode. For example, in FIG. 1, the transmission shifter 14 is in the angular position corresponding to the DRIVE transmission mode. In contrast, in FIG. 2 the transmission shifter 14 is in the angular position that corresponds to the PARK mode.

As will be described in greater detail below, when the transmission shifter 14 is in the PARK position illustrated in FIG. 2, one may depress the actuator button 42 on the base 12 to displace the transmission shifter from the PARK position into the storage position illustrated in FIG. 3 wherein the transmission shifter rests within in the shifter receiver 18. In the illustrated embodiment, the transmission shifter 14 nests within the receiver, folding flat so as to be held completely below the upper surface 22 of the base 12.

Figure 2:
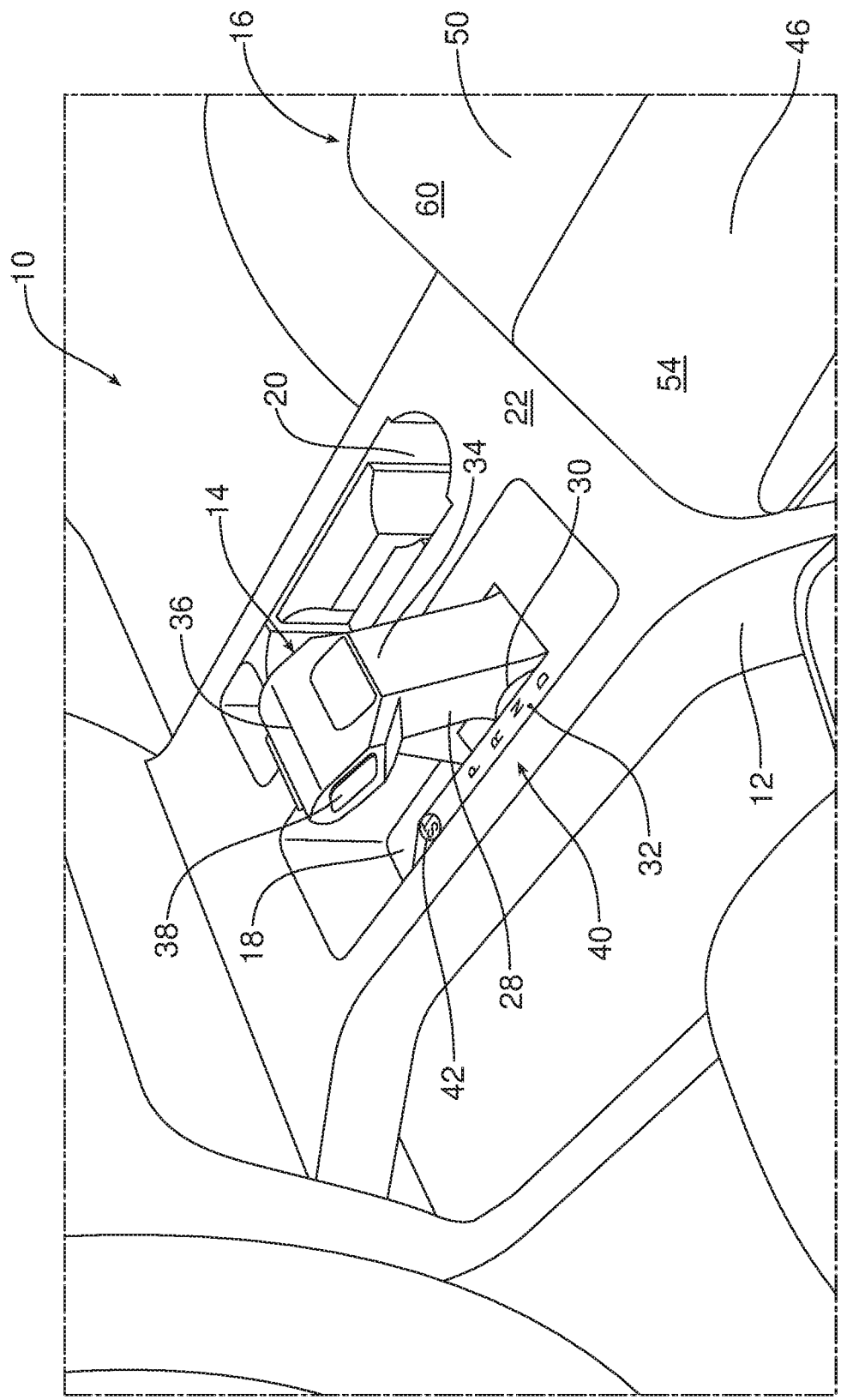
FIG. 2 is a view similar to FIG. 1 but showing the transmission shifter in the park position.
Figure 3:
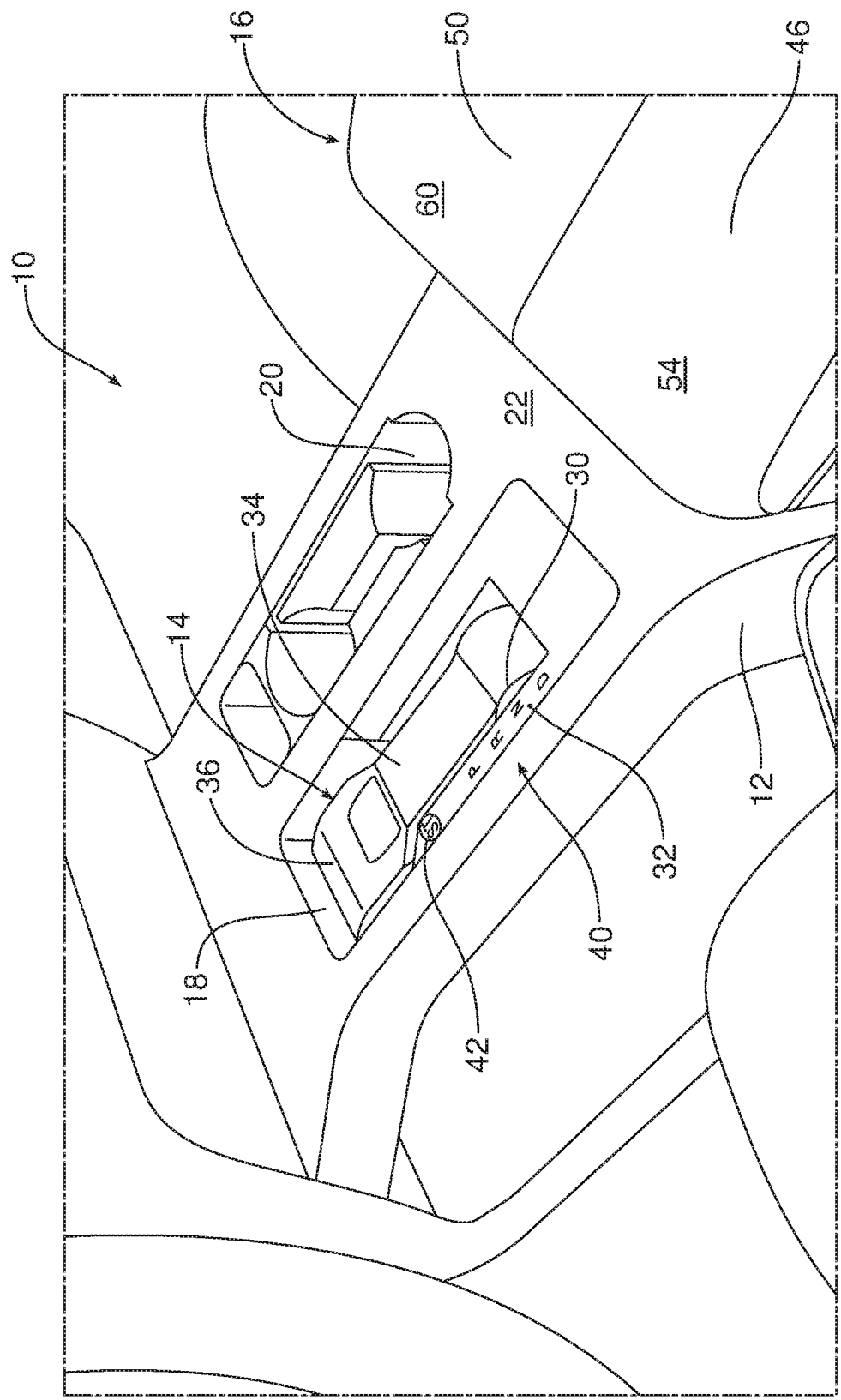
FIG. 3 is a view similar to FIGS. 1 and 2 but showing the transmission shifter in the storage position nesting in the shifter receiver in the top surface of the base of the console assembly.
Figure 4:
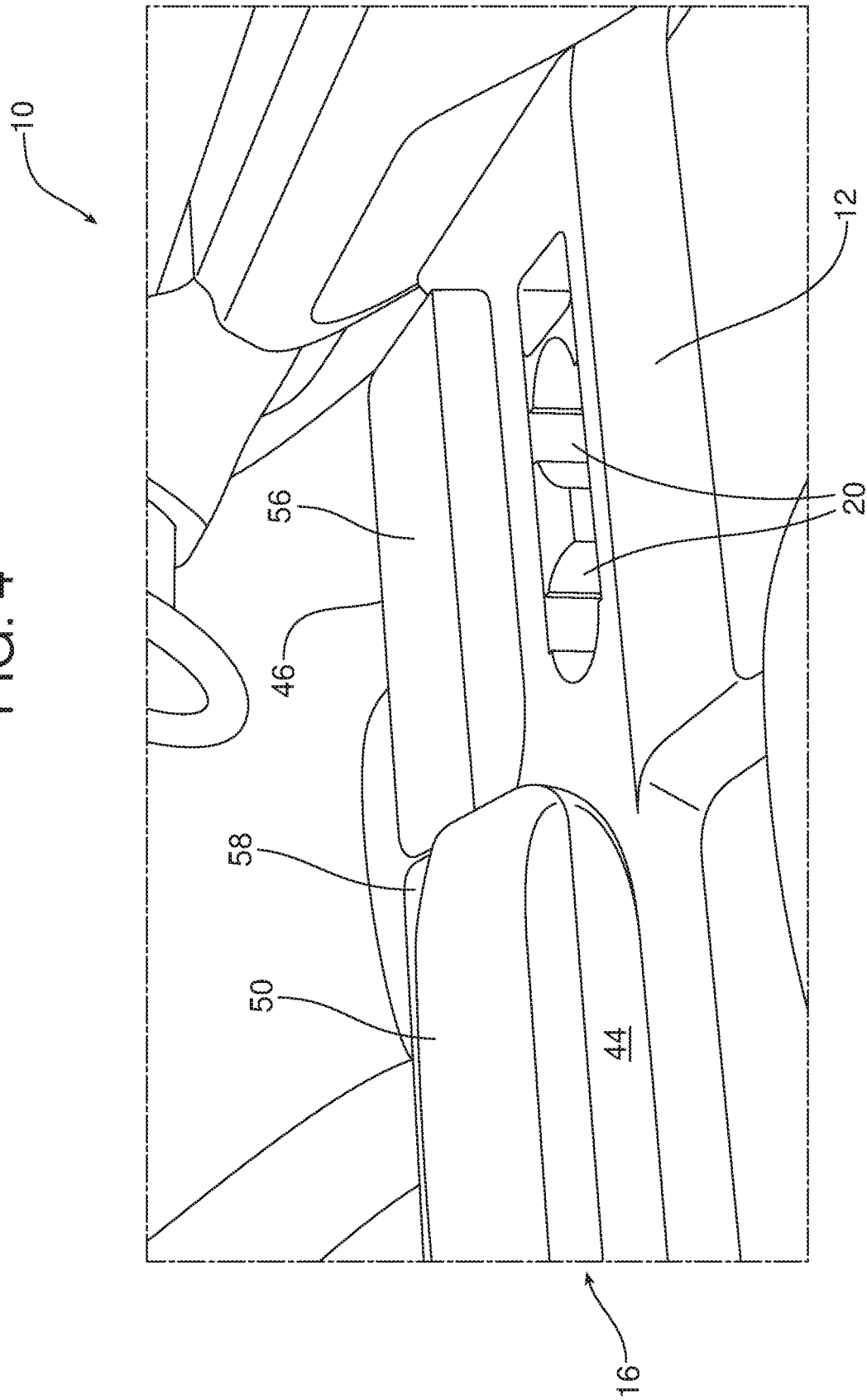
FIG. 4 is a perspective view illustrating the console assembly wherein the second section of the armrest is illustrated in the deployed position overlying the transmission shifter which is resting in the shifter receiver of the base of the console assembly.
Figure 5:
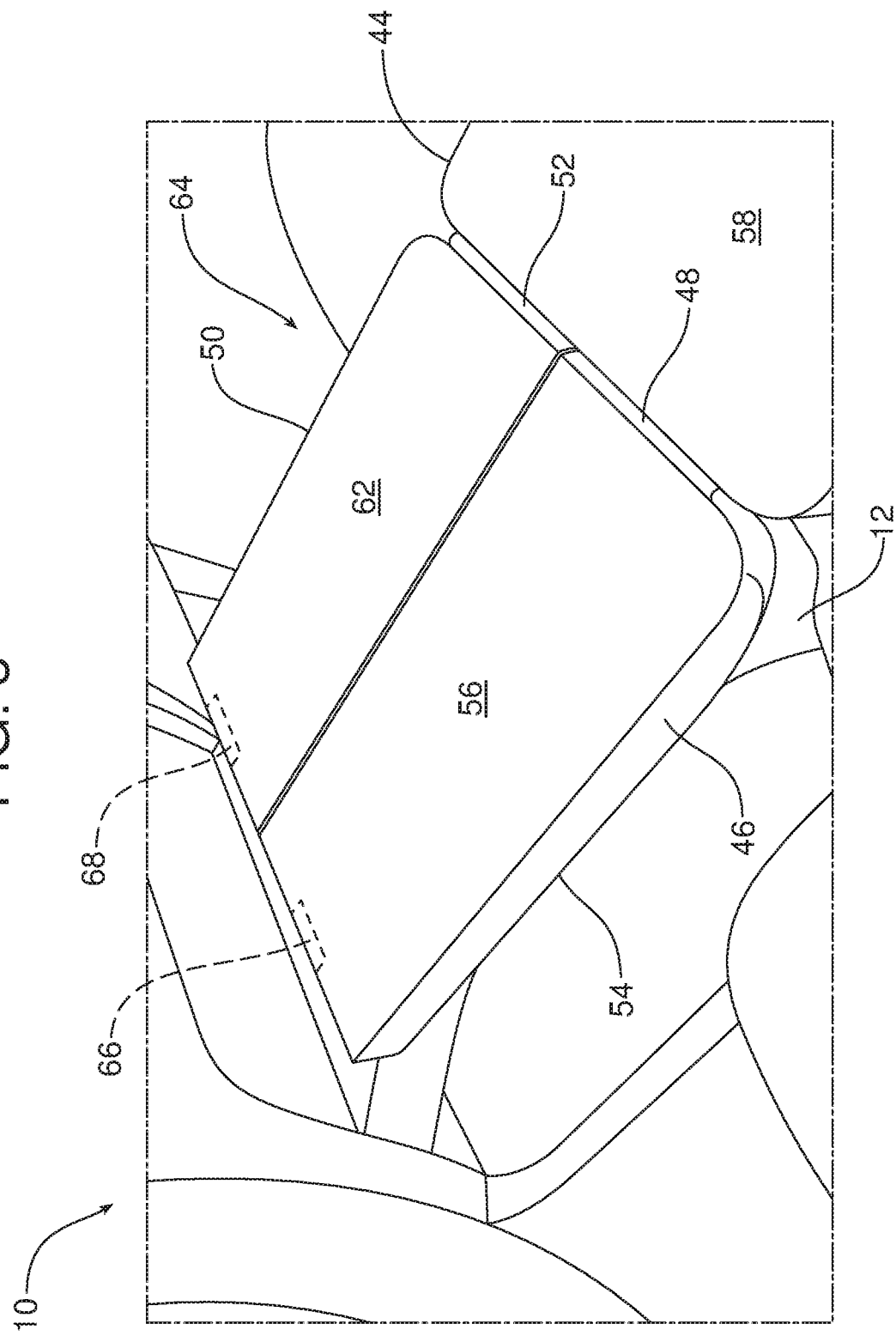
FIG. 5 is an additional perspective view illustrating the second and third sections of the armrest in the deployed position.

This folding action creates the necessary clearance to allow the armrest 16 to be displaced from the home position illustrated in FIGS. 1-3 to the partially deployed position illustrated in FIG. 4 or the fully deployed position illustrated in FIG. 5.

More specifically, the armrest 16 includes a first section 44 that is connected to the base 12 by means of the hinge 26 at the rearmost and lowermost corner thereof. The armrest 16 also includes a second section 46 connected by the first pivot feature 48 to the first section 46 and a third section 50 connected by the second pivot feature 52 to the first section.

More specifically, the second section 46 overlies the first section 44 when the armrest is in the home position (see FIGS. 1-3 and 6) but overlies the transmission shifter 14 in the shifter receiver 18 when the transmission shifter 14 is in the storage position and the armrest is in the deployed position. The third section 50 overlies the first section 44 when in the home position but overlies the cup holder 20 when the in the deployed position.

The second section 46 includes a first armrest cushion 54 on a first side and a first work surface 56 on a second side opposite the first side. The first section 44 of the armrest 16 includes a second work surface 58. Similar to the second section 46, the third section 50 of the armrest 16 includes a second armrest cushion 60 on a first face and third work surface 62 on a second face opposite the first face.

When the second section 46 of the armrest 16 is in the home position, the first armrest cushion 54 is exposed to support an elbow or forearm of the driver or front passenger of the motor vehicle and the first work surface 56 is facing and juxtaposed to the second work surface 58 of the first section 44. In contrast, when the second section 46 is pivoted about the first pivot feature 48 into the deployed position illustrated in FIG. 4, the first work surface 56 is exposed and the first armrest cushion 54 is oriented toward the transmission shifter 14 and the shifter receiver 18.

Similarly, when the third section 50 of the armrest 16 is in the home position illustrated in FIGS. 1-4, the second armrest cushion 60 is exposed to support the elbow or forearm of the driver or front seat passenger and the third work surface 62 is facing and juxtaposed to the second work surface 58 of the first section 44 (see FIGS. 1-3 and 6). In contrast, when the third section 50 of the armrest 16 is in the deployed position as illustrated in FIG. 5, the third work surface 62 is exposed and the second armrest cushion 60 is oriented toward and overlies the cup holder 20 in the upper surface 22 of the base 12.

As should be appreciated, when the armrest 16 is fully deployed as illustrated in FIG. 5, the first work surface 56, the second work surface 58 and the third work surface 62 form a relative smooth and flat expansive work area 64. Such a work area 64 may be used as a desktop to support a laptop or writing pad or for other purposes.

It should be appreciated that the console assembly 10 may further include a first releasable latch feature 66 of a type known in the art to secure the second section 46 of the armrest 16 in the home position illustrated in FIGS. 1-3 and 6. That first releasable latch feature 66 may be released by means of a lever, push button or other actuator (not shown) to allow one to displace the second section 46 from the home position illustrated in FIGS. 1-3 about the first pivot feature 48 into the deployed position illustrated in FIG. 4.

Similarly, the console assembly 10 may include a second releasable latch feature 68 to secure the third section 50 of the armrest 16 in the home position illustrated in FIGS. 1-3. A latch, push button or other actuator (not shown) may be utilized to release the second releasable latch feature 68 and allow one to displace the third section 50 of the armrest 16 about the second pivot feature 52 from the home position illustrated in FIGS. 1-4 to the deployed position illustrated in FIG. 5.

Figure 6:
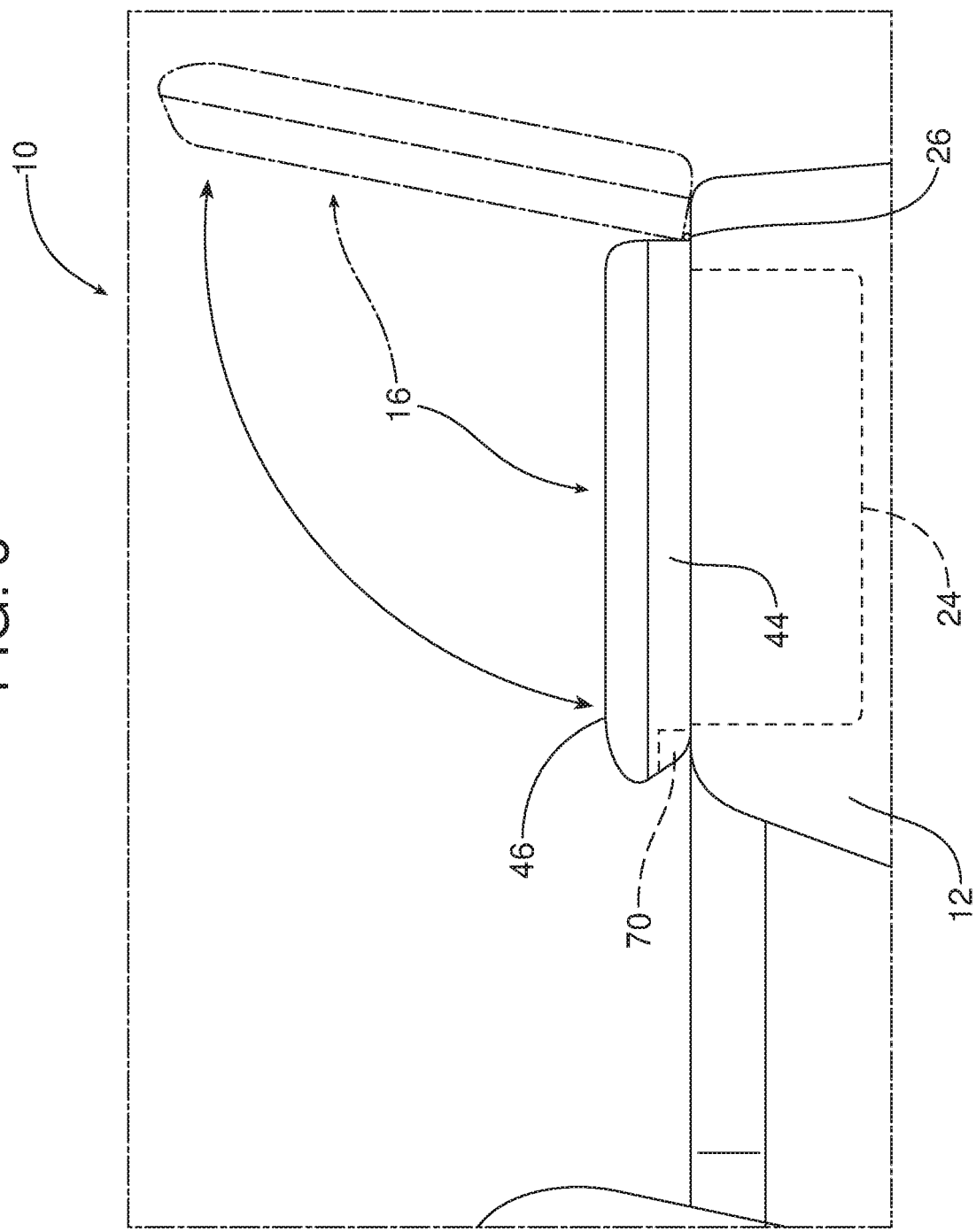
FIG. 6 is a side elevational view illustrating the armrest in full line in a closed position overlying a storage bin in the base of the console assembly and a rearly pivoted open position in phantom line allowing access to the storage bin.

Still further, the console assembly 10 may include a third releasable latch feature 70 to secure the armrest 16 in the closed position illustrated in full line in FIG. 6 wherein the armrest 16 overlies and conceals the storage bin 24. A lever, push button or other actuator (not shown) may be utilized to release the third releasable latch feature 70 and allow one to displace the armrest 16 about the hinge 26 from the closed position illustrated in full line in FIG. 6 to the open position illustrated in phantom line in FIG. 6 to thereby allow access to the storage bin 24.

In use, the transmission shifter 14 is positioned in the transmission mode defining position for DRIVE (see FIG. 1) when driving the motor vehicle to a desired destination.

Upon reaching that desired destination, the push button 38 is depressed to pivot the transmission shifter 14 about the pivot pin 32 into the transmission mode position corresponding to PARK (see FIG. 2). Next, the operator depresses the actuator 42 and displaces the transmission shifter 14 about the pivot pin 32 into the storage position illustrated in FIG. 3. In this position, the transmission shifter 14 is fully resting within the shifter receiver 18 below the upper surface 22 of the base 12.

This provides the necessary clearance to allow the operator to release the first releasable latch feature 66 and deploy the second section 46 of the armrest 16. More specifically, the second section 46 is displaced about the first pivot feature 48 from the home position illustrated in FIGS. 1-3 to the deployed position illustrated in FIG. 4 overlying the transmission shifter 14 in the shifter receiver 18. Next, the operator may release the second releasable latch feature 68 and displace the third section 50 of the armrest 16 from the home position illustrated in FIG. 4 about the second pivot feature 52 to the deployed position illustrated in FIG. 5. Together, the first work surface 56, the second work surface 58 and the third work surface 62 define the expansive work area 64 that would not be available without the ability to stow the transmission shifter 14 within the shifter receiver 18 of the base 12.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A console assembly, comprising;
    a base;
    a transmission shifter carried on said base, said transmission shifter being displaceable between a plurality of transmission mode defining positions and a storage position; and
    an armrest carried on said base, said armrest being displaceable between a home position and a deployed position, wherein said armrest includes a first section connected to said base and a second section connected by a first pivot feature to said first section, and wherein said second section overlies said first section when in said home position and overlies said transmission shifter when said transmission shifter is in said storage position and said armrest is in said deployed position.

2. The console assembly of claim 1, wherein said base includes a shifter receiver and said transmission shifter rests within said shifter receiver when in said storage position.

3. The console assembly of claim 2, wherein said shifter receiver is recessed with respect to an upper surface of said base and said transmission shifter is held below said upper surface when in said storage.

4. The console assembly of claim 3, wherein said second section includes an armrest cushion on a first side and a first work surface on a second side opposite said first side.

5. The console assembly of claim 4, wherein said first section includes a second work surface.

6. The console assembly of claim 5, wherein (a) said armrest cushion is exposed and (b) said first work surface is facing said second work surface when said armrest is in said home position.

7. The console assembly of claim 6, wherein said first work surface is exposed and said armrest cushion is oriented toward said shifter receiver when said armrest is in said deployed position.

8. The console assembly of claim 7, further including a first releasable latch feature to secure said second section in said home position.

9. The console assembly of claim 8, wherein said armrest includes a third section connected by a second pivot feature to said first section.

10. The console assembly of claim 9, wherein said third section includes a second armrest cushion on a first face and a third work surface on a second face opposite said first face.

11. The console assembly of claim 10, wherein (a) said second armrest cushion is exposed and (b) said third work surface is facing said second work surface when said armrest is in home position.

12. The console assembly of claim 11, wherein said third work surface is exposed and said second armrest cushion is oriented toward said base when said armrest is in said deployed position whereby said first work surface, said second work surface and said third work surface form a flat work area.

13. The console assembly of claim 12, further including a second releasable latch feature to secure said third section in said home position.

14. The console assembly of claim 13, wherein said base further includes at least one cup well, said cup well being provided in said upper surface adjacent said shifter receiver.

15. The console assembly of claim 14, wherein said cup well is concealed by said third section when said third section is in said deployed position.

16. The console assembly of claim 15, further including a storage bin in said base underlying said first section of said armrest.

17. The console assembly of claim 16, further including a hinge connecting said first section of said armrest to said base.

18. The console assembly of claim 17, wherein said hinge is located at an end of said armrest opposite said first pivot feature.

* * * * *